(12) United States Patent
Parks et al.

(10) Patent No.: US 10,308,346 B2
(45) Date of Patent: Jun. 4, 2019

(54) SOLAR-POWERED AIRCRAFT

(71) Applicant: Aurora Flight Sciences, Manassas, VA (US)

(72) Inventors: Robert W. Parks, San Jose, CA (US); Francesco Giannini, Vienna, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 153 days.

(21) Appl. No.: 15/134,938

(22) Filed: Apr. 21, 2016

(65) Prior Publication Data
US 2016/0311545 A1    Oct. 27, 2016

Related U.S. Application Data

(60) Provisional application No. 62/150,520, filed on Apr. 21, 2015.

(51) Int. Cl.
*B64C 3/42* (2006.01)
*B64C 5/02* (2006.01)
(Continued)

(52) U.S. Cl.
CPC ............... *B64C 3/42* (2013.01); *B64C 3/38* (2013.01); *B64C 5/02* (2013.01); *B64C 23/072* (2017.05); *B64C 29/0033* (2013.01); *B64D 27/24* (2013.01); *B64C 39/04* (2013.01); *B64D 2211/00* (2013.01); *Y02T 50/14* (2013.01);
(Continued)

(58) Field of Classification Search
CPC ....... B64C 3/42; B64C 29/0033; B64C 27/24; B64C 5/02; B64D 2211/00; B64D 27/24; Y02T 50/44; Y02T 50/62; Y02T 50/145
See application file for complete search history.

(56) References Cited

U.S. PATENT DOCUMENTS

| 3,188,022 A | 6/1965 | Ornberg |
| 4,415,133 A | 11/1983 | Phillips |

(Continued)

FOREIGN PATENT DOCUMENTS

| GB | 2328657 | 3/1999 |
| GB | 2454531 | 5/2009 |

OTHER PUBLICATIONS

International Search Report and Written Opinion dated Dec. 28, 2016, for International application No. PCT/US16/28561.

(Continued)

*Primary Examiner* — Valentina Xavier
(74) *Attorney, Agent, or Firm* — Michael Stanley Tomsa; McAndrews, Held & Malloy, Ltd.; Eugene H. Nahm (57) ABSTRACT

The present invention is directed to a solar-powered aircraft comprising a fixed wing panel, a motor driven propeller, a plurality of secondary wing panels, and a tail assembly having a first tail panel and a second tail panel. Each secondary wing panel being configured to rotate about a first longitudinal pivot axis extending from a distal end of the fixed wing panel through a central transverse portion of the secondary wing panel. The secondary wing panels may comprise an array of solar panels on its surface. The first tail panel comprises a second array of solar panels located on a surface of the first tail panel, the first tail panel being configured to rotate about a second longitudinal pivot axis through a central transverse portion of the first tail panel.

22 Claims, 7 Drawing Sheets

(51) Int. Cl.
*B64C 29/00* (2006.01)
*B64D 27/24* (2006.01)
*B64C 3/38* (2006.01)
*B64C 23/06* (2006.01)
*B64C 39/04* (2006.01)

(52) U.S. Cl.
CPC ............... *Y02T 50/44* (2013.01); *Y02T 50/55* (2018.05); *Y02T 50/62* (2013.01)

(56) References Cited

U.S. PATENT DOCUMENTS

| | | | |
|---|---|---|---|
| 5,810,284 | A | 9/1998 | Hibbs et al. |
| 6,368,743 | B1 | 4/2002 | Guerin et al. |
| 7,198,225 | B2 | 4/2007 | Lisoski et al. |
| 7,762,495 | B2 | 7/2010 | Miller |
| 8,356,770 | B2 | 1/2013 | Parks |
| 8,937,254 | B2 | 1/2015 | Wen et al. |
| 2003/0141409 | A1* | 7/2003 | Lisoski ............ B64C 3/42 244/13 |
| 2009/0026316 | A1* | 1/2009 | Miller ............ B64C 39/024 244/123.1 |
| 2009/0292407 | A1 | 11/2009 | Minelli et al. |
| 2010/0213309 | A1 | 8/2010 | Parks |
| 2011/0057617 | A1 | 3/2011 | Finberg et al. |
| 2012/0091263 | A1 | 4/2012 | Parks |
| 2014/0248520 | A1 | 9/2014 | Ward et al. |
| 2014/0252156 | A1 | 9/2014 | Hiebl et al. |
| 2016/0311528 | A1* | 10/2016 | Nemovi ............ B64C 27/82 |

OTHER PUBLICATIONS

Hall, David W., et al., A Preliminary Study of Solar-powered Aircraft and Associated Power Trains, NASA Contractor Report 3699, Contract NAS1-16975, Dec. 1983.

Phillips, William H., Some Design Considerations for Solar-Powered Aircraft, NASA Technical Paper 1675, Jun. 1980.

Extended European search report for Application No. 16818379.6 dated Jan. 3, 2019.

\* cited by examiner

SOLAR-POWERED AIRCRAFT

CROSS-REFERENCE TO RELATED APPLICATION

The present application claims the benefit under 35 U.S.C. § 119(e) of provisional patent application Ser. No. 62/150,520, filed Apr. 21, 2015, the contents of which are hereby incorporated by reference.

FIELD OF THE INVENTION

The present invention generally relates to a solar-powered aircraft comprising one or more propeller assemblies, a fixed wing panel, and a plurality of secondary wing panels configured to rotate about a longitudinal pivot axis extending from a distal end of the fixed wing panel through a central transverse portion of the secondary wing panel. The fixed and secondary wing panels may comprise an array of solar panels on their surfaces.

BACKGROUND

The concept of high-altitude, long-endurance solar-powered aircraft has been demonstrated by a number of air vehicle research projects in the past. In 1974, AstroFlight built the first solar-powered drone, Sunrise I. The promising results of the 32 foot span, Sunrise I, led to the Sunrise II, which with 4480 solar cells was theoretically capable of attaining a service ceiling of 75,000 feet. Sunrise II flew successfully, but broke up in flight at 22,000 feet due to a suspected aeroelastic problem. The next advance in solar-powered flight occurred in 1980 with AeroVironment's Gossamer Penguin, which performed the first solar flight carrying a human, followed by the Solar Challenger, which reached an altitude of 12,000 feet on its flight across the English Channel. NASA's High Altitude Solar (HALSOL) project in 1995 saw the flight of the Pathfinder, which reached an altitude of 50,000 feet. This was followed by the Pathfinder-Plus which, with its new 19% efficient silicon solar cells, was able to reach 80,201 feet. The Pathfinder aircraft then led directly to the Centurion. The Centurion was aimed at creating an aircraft that would have a real world scientific application. The Centurion had a span of 206 feet with 62,120 bi-facial solar cells.

Under NASA's Environmental Research Aircraft and Sensor Technology Program, 1998-2003, the Centurion was modified to become Helios. The Helios prototype was designed as a proof of concept high-altitude unmanned aerial vehicle that could fly on long endurance environmental science or telecommunications relay missions lasting weeks or months. Helios made use of 19% efficient silicon based solar cells on the upper wing and lithium batteries. Helios had a constant 8 foot chord and was assembled in six 41-foot sections with under-wing pods at the juncture of each section. Helios reached record-setting altitude of 96,000 feet on solar power. In subsequently testing, Helios broke up in-flight. The in-flight break-up was caused when a gust-induced aeroelastic wing shape change led to control system instability. The resulting pitch oscillation resulted in excessive speeds which caused failure of the wing covering. The wing spar actually withstood deflections of 150% of the design configuration. In 2005, AC Propulsion developed the SoLong aircraft. With the energy storage advances made with Li-Ion batteries (220 Whr/kg), SoLong was able to stay airborne for two half nights, starting with a charged battery at midnight and flying to midnight the next day. This initial 24 hour flight was followed a few months later with a full 48 hour flight. In 2007, the English company Qinetiq flew the Zephyr 54 hours. This aircraft has taken advantage of both 25% efficient solar cells and 350 Whr/kg Lithium Sulfur batteries.

The best example of previously built and flown state of the art is the AeroVironment aircraft, culminating in the Helios. Much of this is described in U.S. Pat. No. 5,804,284, to Hibbs, et al. (hereinafter, the Hibbs patent). The Hibbs patent shows a very large wingspan aircraft, with the solar collection and other mass distributed along a very high aspect ratio wing. This allowed the use of a very light wing spar, and the simple, clean design consumed very low power during the night. As discussed in great detail below, night time power usage is especially critical, because the storage system is quite heavy, and there is a storage "round trip" efficiency. This means that a large amount of solar energy must be collected to provide even a small amount of power at night. In the example given in the Hibbs patent, 2.5 Watt hours of electrical power had to be collected during the day to provide 1 Watt hour at night.

However, a significant limitation of the airplane disclosed in the Hibbs patent is that it is poor at collecting energy during the winter time at high latitudes. For example, London, England is approximately 51.5 degrees latitude. At winter solstice, the peak elevation of the sun above the horizon is only 15 degrees, and the horizontal solar collector, as shown in the Hibbs patent, will collect at most 25% of the energy it would collect with the sun overhead. Another significant limitation is that at high latitudes, the aircraft must fly predominantly towards the west, so the sun, at peak elevations, will be predominantly off the left wing tip. Thus the normal flexing of the wing, such as shown in flight on Helios, aims much of the wing panels away from the sun, while also putting some of the remainder of the wing in the shadow of the left wing tip. Thus, the net collection capability is likely only about 15% of what it could optimally collect with the sun overhead. The poor collection geometry of the airplane disclosed in the Hibbs patent (i.e., the horizontal solar panels), combined with short days and long nights makes it very difficult for the Hibbs' airplane to collect sufficient solar energy.

Nevertheless, improved collection geometry has been suggested in the prior art. An example is shown in U.S. Pat. No. 4,415,133, issued in 1983 to Phillips (hereinafter the Phillips patent). This configuration is also shown in NASA Technical Paper 1675, "Some Design Considerations for Solar-Powered Aircraft," published in June 1980, also by Phillips. The cruciform configuration shown is capable of flying in any desired roll attitude, and thus can have its solar panel track the sun in elevation. While the cruciform configuration disclosed in the Phillips patent provides improved solar energy collection than the configuration shown in the Hibbs patent, it has twice as much wing area as is needed to produce lift, and thus incurs a significant penalty in drag and thus energy required to fly, especially during the night (when no solar radiation energy collection can occur).

Another NASA study published in 1983, Contractor Report CR-3699 by Hall, Dimiceli, Fortenbach and Parks, entitled "A Preliminary Study of Solar-powered Aircraft and Associated Power Trains" (hereinafter the 1983 NASA C. Report) looked at, among other things, a wide range of configurations that attempted to combine both low power consumption at night with good solar radiation energy collection geometry during the day. Some of these configurations are shown in FIGS. 46 and 47 of the report, on pages 120 and 121 respectively. Configurations 2 and 3 in FIG. 46 show aircraft that have pointable collectors, but exhibit high drag both during days and nights. FIG. 4 of the report shows an early attempt to combine improved solar energy collection with good night time power efficiency. As those of ordinary skill in the art can appreciate, however, only one of the elevated wing panels has good solar energy collection. For westward flight with the sun off the left wing tip, the left wing has poor solar energy collection, as mentioned above, and can shadow the right wing.

Variable geometry designs are shown in FIG. 47 of the 1983 NASA C. Report, particularly in configurations 14, 17, and 18. All of these have a large wing span, and all of the wings provide lift for low night time energy consumption. Configurations 17 and 18 are symmetric in both day and night modes, but require solar cells on the bottom of one tip and on the top of the other. This is good for typical westerly winds, but for the occasional easterly winds, cells would be needed on both sides of both tips, which is both a mass and cost penalty. Configuration 14 of FIG. 47 provides solar cells on top of both tips, but is not symmetric, and it was believed that the control systems of the time would not be able to fly the airplane. Furthermore, in configurations 14, 17, and 18, the wing tips were only able to be oriented vertically or horizontally. Thus, while they were pretty good at solar radiation energy collection with the sun on the horizon or overhead, their solar radiation energy collection is significantly reduced when the sun is at 30° to 40° elevation angle with respect to the horizon.

A significant shortcoming of all three configurations shown in FIG. 47 of the 1983 NASA C. Report is that when the wing tips are vertical, they cannot support their own weight. As a result, a large downwardly directed load is brought upon the tips of the center section. To enable the aircraft to support such large load factors, a large structural mass is designed into the aircraft. Because the tips cannot support their own weight, the fraction of the span that could be pivoted up is limited.

In U.S. Pat. No. 7,198,225, issued in 2007, to Lisoski and Kendall (hereinafter referred to as the Lisoski patent), which also relates to the Helios type aircraft, a variant of Helios is proposed with variable wing angles to improve solar radiation energy collection, as shown in FIGS. 6E and 6F. However, as those of ordinary skill in the art can appreciate, the configurations shown in FIGS. 6E and 6F of the Lisoski patent are essentially the same concept shown in FIG. 46 of the 1983 NASA C. Report, configuration 4.

All of the above concepts have some problems with either solar collection at low sun elevation angles, sun collection at medium sun elevation angles, night time energy requirements or excessive structural mass. Thus, there is a need for a solar aircraft configuration that can effectively adapt to a wide range of sun angles, does not carry collectors that are not useful at some sun angles, has very low drag for low night time energy requirements, and also does not require excessive structural mass, and thus can allocate a large mass to the energy storage system.

While the historical solar-powered aircraft have increased flight duration and altitude over time, none have exhibited the ability to fly at high latitudes; none have any shown greater duration than perhaps a day or two. Thus, historical solar-powered aircraft all have limitations due to poor high latitude solar collection efficiency, due to the horizontal nature of their arrays and insufficient energy storage to fly through a long winter night; therefore there is also a need for an improved energy storage system. Thus, a need exists for a solar-powered aircraft that can overcome the deficiencies of the prior art, by operating at high latitudes and during long periods of darkness.

SUMMARY

According to a first aspect of the present invention, a solar-powered aircraft comprises one or more propeller assemblies, a fixed wing panel, and a plurality of secondary wing panels configured to rotate about a longitudinal pivot axis extending from a distal end of the fixed wing panel through a central transverse portion of the secondary wing panel, wherein the secondary wing panels comprise an array of solar panels on a surface of the secondary wing panels.

According to a second aspect of the present invention, the solar-powered aircraft further comprises a plurality of tail sections having a first tail panel and a second tail panel, wherein at least one of the first tail panels or the second tail panels comprises an array of solar panels located on a surface of the first tail panel or the second tail panel and are configured to rotate about a central transverse portion of the first or second tail panel. In some embodiments, the first tail panel is positioned on the aircraft closer to the fixed wing panel than the second tail panel. In some embodiments, the plurality of secondary panels, the first tail panel and the second tail panel rotate as a single unit.

According to a third aspect of the present invention, a method of collecting solar energy on an aircraft comprises the steps of providing an aircraft comprising one or more propeller assemblies, a fixed wing panel, and a plurality of secondary wing panels configured to rotate about a longitudinal pivot axis extending from a distal end of the fixed wing panel through a central transverse portion of the secondary wing panel, wherein the secondary wing panels comprise an array of solar panels on a surface of the secondary wing panels, collecting solar energy with the array of solar panels by rotating the secondary wing panels in a direction to the sun.

According to a fourth aspect of the present invention, a method of continuously operating a solar-powered aircraft comprising the steps of providing an aircraft comprising one or more propeller assemblies, a fixed wing panel, and a plurality of secondary wing panels configured to rotate about a longitudinal pivot axis extending from a distal end of the fixed wing panel through a central transverse portion of the secondary wing panel, wherein the secondary wing panels comprise an array of solar panels on a surface of the secondary wing panels, collecting, using and storing solar energy with the arrays of solar panels by rotating the secondary wing panels in a direction to the sun during the day, rotating the secondary wing panels in a position that is substantially co-planar to the fixed wing panel during the night, and using the stored solar energy to operate the aircraft during the night.

According to a fifth aspect of the present invention, a solar-powered aircraft comprises: a fixed wing panel; a motor driven propeller; a plurality of secondary wing panels, each of said plurality of secondary wing panels configured to rotate about a first longitudinal pivot axis extending from a distal end of the fixed wing panel through a central transverse portion of the secondary wing panel, wherein each of said plurality of secondary wing panels comprises a first array of solar panels on its surface; and a tail assembly having a first tail panel and a second tail panel, wherein the first tail panel comprises a second array of solar panels located on a surface of the first tail panel, the first tail panel being configured to rotate about a second longitudinal pivot axis through a central transverse portion of the first tail panel.

According to a fifth aspect of the present invention, a solar-powered aircraft comprises: a fixed wing panel; a motor driven propeller; and a plurality of secondary wing panels, each of said plurality of secondary wing panels configured to rotate about a first longitudinal pivot axis extending from a distal end of the fixed wing panel through a central transverse portion of the secondary wing panel, wherein each of said plurality of secondary wing panels comprises an array of solar panels on its surface.

According to a sixth aspect of the present invention, a method of continuously operating a solar-powered aircraft having a fixed wing panel, a motor driven propeller, and a secondary wing panel. The method comprising: (i) collecting and storing solar energy via an array of solar panels positioned on the secondary wing panel, wherein the secondary wing panel is positioned in a first position; (ii) rotating the secondary wing panel from the first position to a second position about a longitudinal pivot axis extending from a distal end of the fixed wing panel through a central transverse portion of the secondary wing panel; and (iii) using the stored solar energy to operate the solar-powered aircraft. The secondary wing panels (a) may be substantially co-planar to the fixed wing panel when the secondary wing panels are in the second position and (b) are not co-planar to the fixed wing panel when the secondary wing panels are in the first position. In certain aspects, the secondary wing panels are positioned (a) in the first direction during the daytime and (b) in the second direction during the nighttime, wherein the solar energy stored at step (i) may operate the solar-powered aircraft during the nighttime.

In certain aspects, the plurality of secondary panels, the first tail panel, and the second tail panel rotate in unison.

In certain aspects, each of the plurality of secondary panels comprises one or more control surfaces to alter or maintain flight characteristics of the aircraft.

In certain aspects, each of the plurality of secondary wing panels is configured to rotate at least 180 degrees about the longitudinal pivot axis.

In certain aspects, solar-powered aircraft further comprises a solar position sensor to determine an elevation of the sun relative to the solar-powered aircraft.

In certain aspects, each of the plurality of secondary wing panels is configured to rotate about the longitudinal pivot axis based on measurements determined by the solar position sensor.

In certain aspects, solar-powered aircraft further comprises a tail section having a first tail panel and a second tail panel, wherein the second tail panel is configured to rotate about a second longitudinal pivot axis through a central transverse portion of the second tail panel.

In certain aspects, the second tail panel comprises an array of solar panels on a surface of the second tail panel.

In certain aspects, each of the plurality of secondary wing panels rotate via a pivot assembly, the pivot assembly having a pivot brake to lock the pivot assembly at a predetermined angle relative to the fixed wing panel.

In certain aspects, the motor driven propeller is coupled to the fixed wing panel.

In certain aspects, the fixed wing panel is sized and shaped to define at each of its distal ends a cutout, each cutout being sized and shaped to nest a portion of the secondary wing panels when the fixed wing panel and the secondary wing panels reside in the same plane.

BRIEF DESCRIPTION OF THE DRAWINGS

The foregoing and other objects, features, and advantages of the devices, systems, and methods described herein will be apparent from the following description of particular embodiments thereof, as illustrated in the accompanying Figures, where like reference numbers refer to like structures. The Figures are not necessarily to scale, emphasis instead being placed upon illustrating the principles of the devices, systems, and methods described herein.

DETAILED DESCRIPTION

Described herein are solar-powered aircraft, methods of collecting solar energy, methods of continuously operating a solar-powered aircraft, and a system and method for storing and managing solar energy.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like are words of convenience and are not to be construed as limiting terms. As utilized herein the terms "circuits" and "circuitry" refer to physical electronic components (i.e., hardware) and any software and/or firmware ("code"), which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

Figure 1:
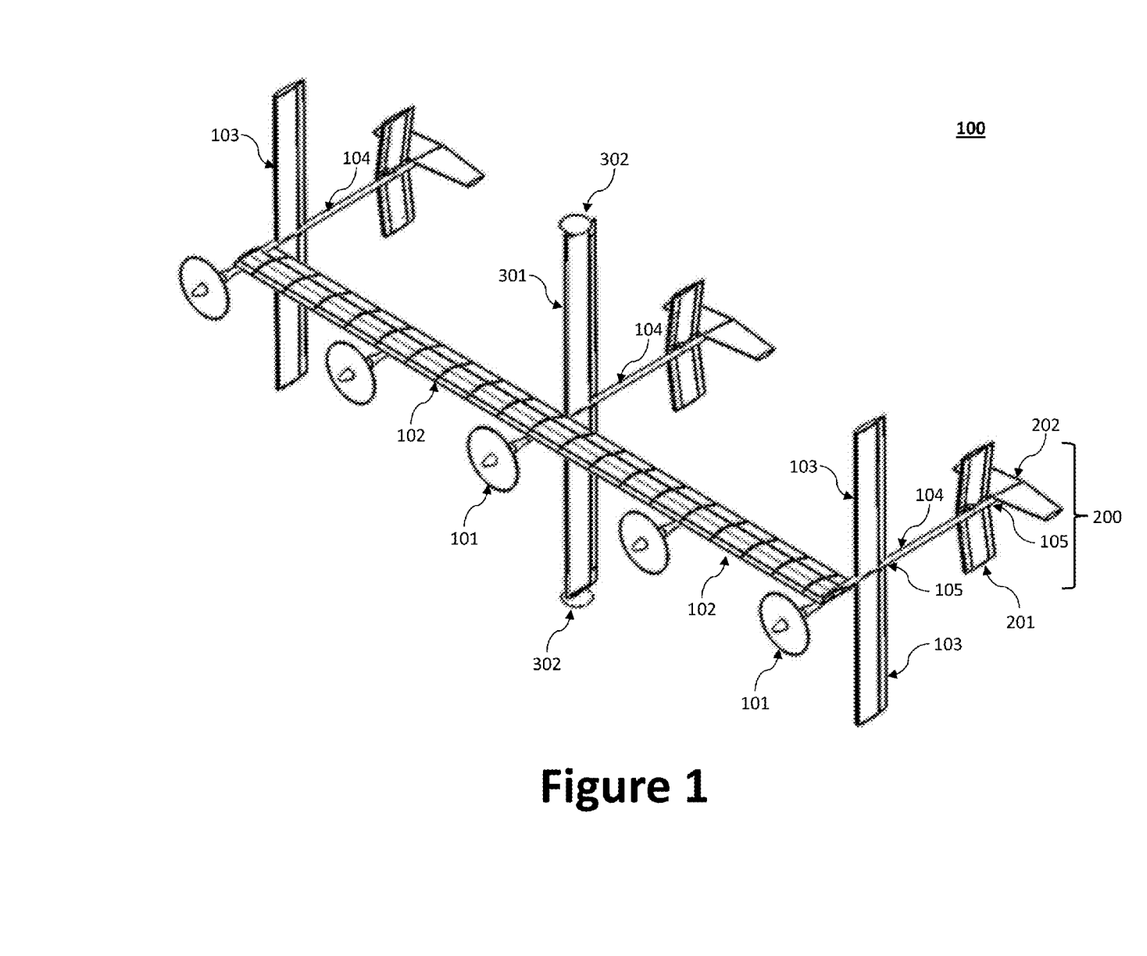
FIGS. 1 through 3 illustrate a solar-powered aircraft in accordance with an aspect of the present invention, which is illustrated during various modes of operation.

FIG. 1 illustrates a perspective view of a first solar-powered aircraft according to an aspect of the present invention. Specifically, FIG. 1 depicts a solar-powered aircraft 100 comprising one or more propeller assemblies 101 (e.g., a propeller and associated gearing, which is axially driven by one or more electric motors), a fixed wing panel 102, one or more fuselages or longitudinal boom 104 (i.e., the rear portion of the fuselage), and a plurality of secondary wing panels 103. One or more of the plurality of secondary wing panels 103 are configured to rotate about a longitudinal pivot axis 303 extending from a distal end of the fixed wing panel 102 through a central transverse portion of the secondary wing panel 103 via a pivot assembly 105. The secondary wing panel's 103 central transverse portion may be substantially half way between the wing tips of the secondary wing panel 103. In other words, the secondary wing panel 103 is mounted such that its pivot point is positioned approximately at the center line of the surface in the spanwise direction such that the secondary wing panels 103 have substantially equal areas on each side of the pivot point at central transverse portion. The secondary wing panels 103 may be traditional wings or canted wings, which may be canted upwardly or downwardly.

Figure 3:
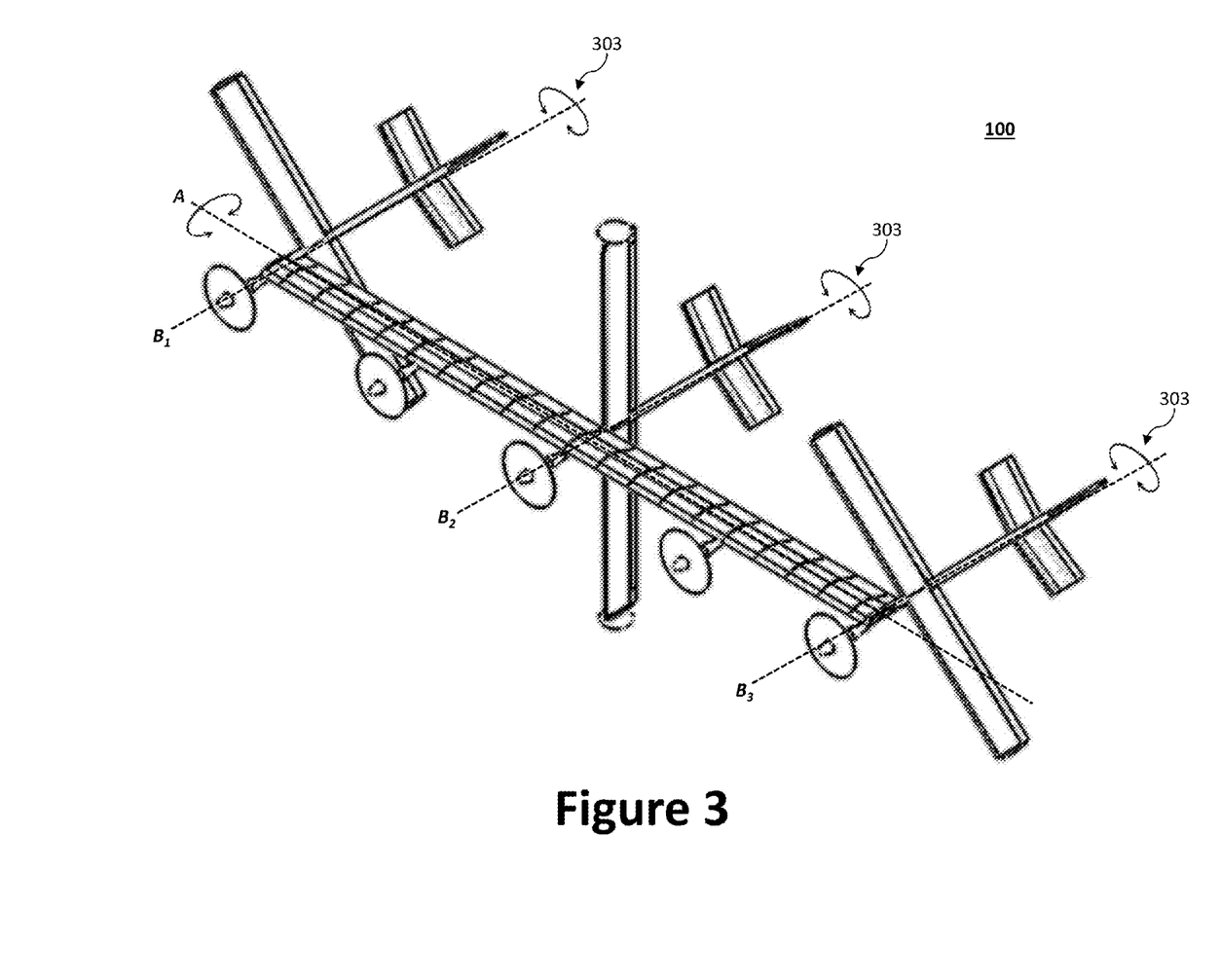

As illustrated in FIG. 3, the longitudinal pivot axes 303 (e.g., Axes $B_1$, $B_2$, $B_3$) for the secondary wing panels 103 and/or tail sections 200 are longitudinal pivot axes that are substantially perpendicular to the transverse axis (i.e., lateral axis) of the fixed wing panel 102 (Axis A), such that each is oriented essentially fore and aft (aligned with the direction of flight). In the illustrated example, the roll axis of the overall solar-powered aircraft 100 coincides with the longitudinal pivot axis 303 marked as $B_2$.

The pivot assembly 105 may, for example, extend aft of the trailing edge of the fixed wing panel 102. To facilitate controlled rotation of the secondary wing panel 103, the pivot assembly 105 may include a pivot brake to lock the pivot and/or a motor (or other actuator) to produce force to rotate the secondary wing panel 103 about the pivot (e.g., about the longitudinal pivot axis 303). For example, a motor driven servo may be used in the pivot assembly 105, and/or small aileron type control surfaces. The secondary wing panels 103 may comprise an array of solar panels 107 on a surface of the secondary wing panels; however the fixed wing panel 102 may further comprise an array of solar panels 107 on a surface of the fixed wing panel 102.

As used herein, "solar panels" refer to an array of one or more photovoltaic cells configured to collect solar energy. The solar panels 107 may employ one or more of the following solar cell types: monocrystalline silicon solar cells, polycrystalline silicon solar cells, string ribbon solar cells, thin-film solar cells (TFSC), cadmium telluride (CdTe) solar cells, copper indium gallium selenide (CIS/CIGS) solar cells, and the like. To reduce overall weight and to improve reliability and durability, it is advantageous to employ light weight and/or flexible solar panels (e.g., thin-film solar panels).

In some embodiments, the solar-powered aircraft 100 may further comprise one or more tail sections 200, each having a first tail panel 201 and a second tail panel 202. The one or more tail section 200 may be coupled to the fixed wing panel 102 via a longitudinal boom 104. The longitudinal boom 104 may define a longitudinal pivot axis perpendicular to the lateral axis of the fixed wing panel 102. The first tail panel 201 (e.g., a first tail airfoil) and the second tail panel 202 (e.g., a second tail airfoil) may be traditional wings or canted wings, which may be canted upwardly or downwardly. As illustrated, the first tail panel 201 may be positioned closer to the fixed wing panel 102 than the second tail panel, wherein at least one of the first tail panels 201 or the second tail panels 202 comprises an array of solar panels 107 located on a surface of the first tail panel 201 or the second tail panel 202. The first tail panel 201 and/or the second tail panel 202 are configured to rotate relative to the fixed wing panel 102 about a central transverse portion of the first or second tail panel via a pivot assembly 105. The first tail panel 201 and the second tail panel 202 may be independently controlled or, in the alternative, the tail section 200 may rotate as a single unit through a pivot assembly. In some embodiments, the plurality of secondary wing panels 103, the first tail panel 201, and the second tail panel 202 may rotate as a single unit. In some embodiments, a solar-powered aircraft of the present invention may comprise one or more tail sections as described in U.S. Pat. No. 8,356,770 B2 to Parks, which is incorporated by reference in its entirety herein.

The solar-powered aircraft 100 may further comprise one or more energy storage devices operatively coupled to the solar panels 107. The one or more energy storage devices store collected solar energy for later use by the solar-powered aircraft 100 (e.g., when sunlight is unavailable, typically at nighttime). As used herein "energy storage device" refers to a battery or similar instrumentality known to those of skill in the art capable of storing and transmitting energy collected from the solar panels 107, including but not limited to a rechargeable battery (e.g., lithium ion batteries), a regenerative fuel cell, or combinations thereof. An energy storage system may employ a plurality of energy storage devices. In certain aspects, the solar-powered aircraft 100 may be supplied with redundant components and/or conductors (power and data signals). The solar-powered aircraft 100 may further comprise embedded conductors, which may convey power and/or data signals throughout the solar-powered aircraft 100. For example, the embedded conductors may be formed as a conductor sandwich assembly, such as is described in greater detail by commonly owned U.S. Pat. No. 8,937,254, titled "Apparatus and Method for an Aircraft Conductor Sandwich Assembly Embedded to an Aircraft Structure."

Figure 2:
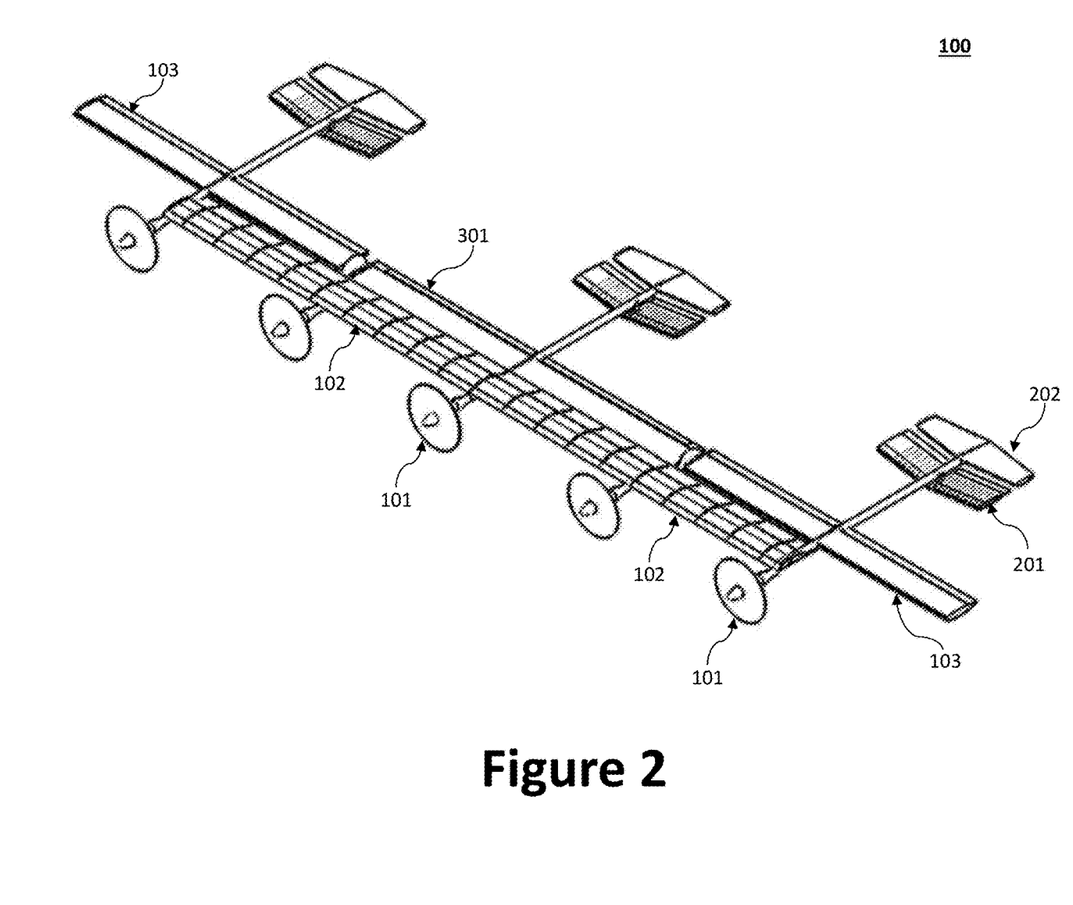
Figure 4A:
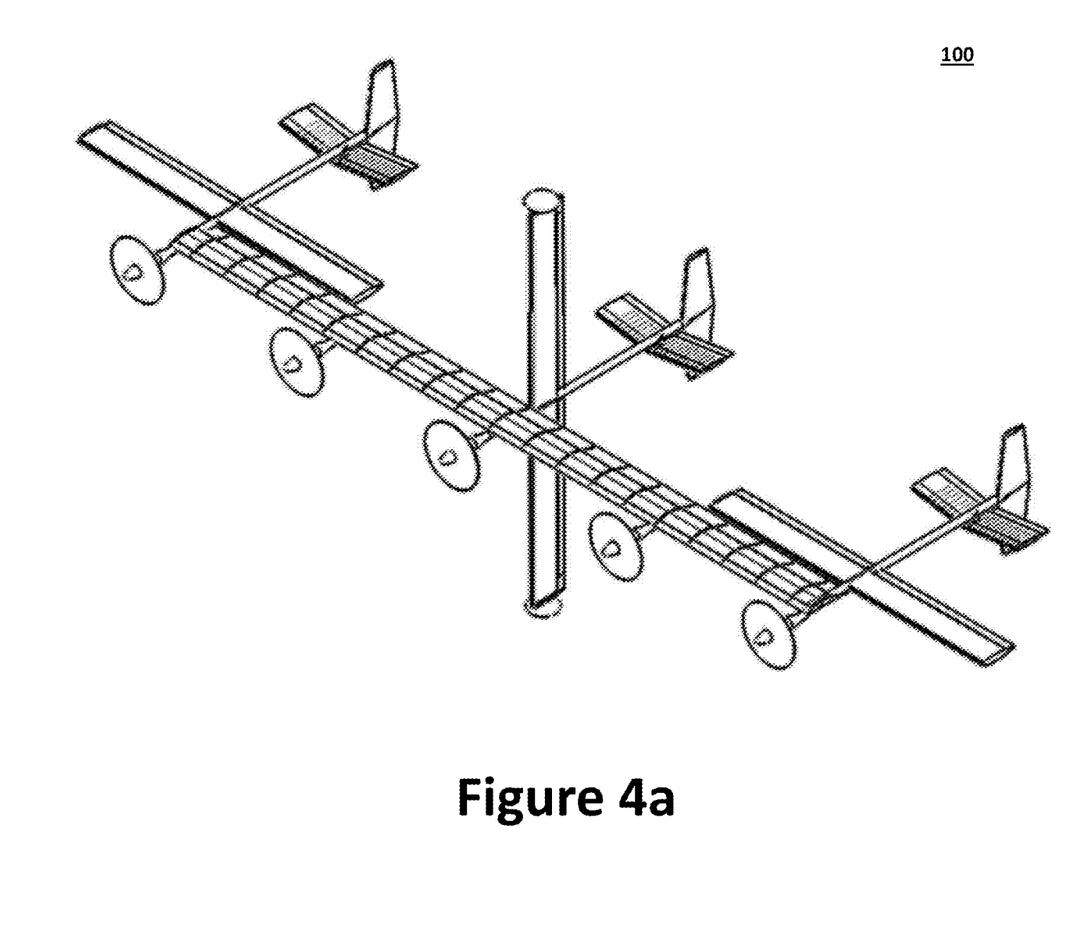
FIG. 4a illustrates the solar-powered aircraft of FIG. 1, while FIG. 4b further depicts various locations wherein solar panels may be located.
Figure 4B:
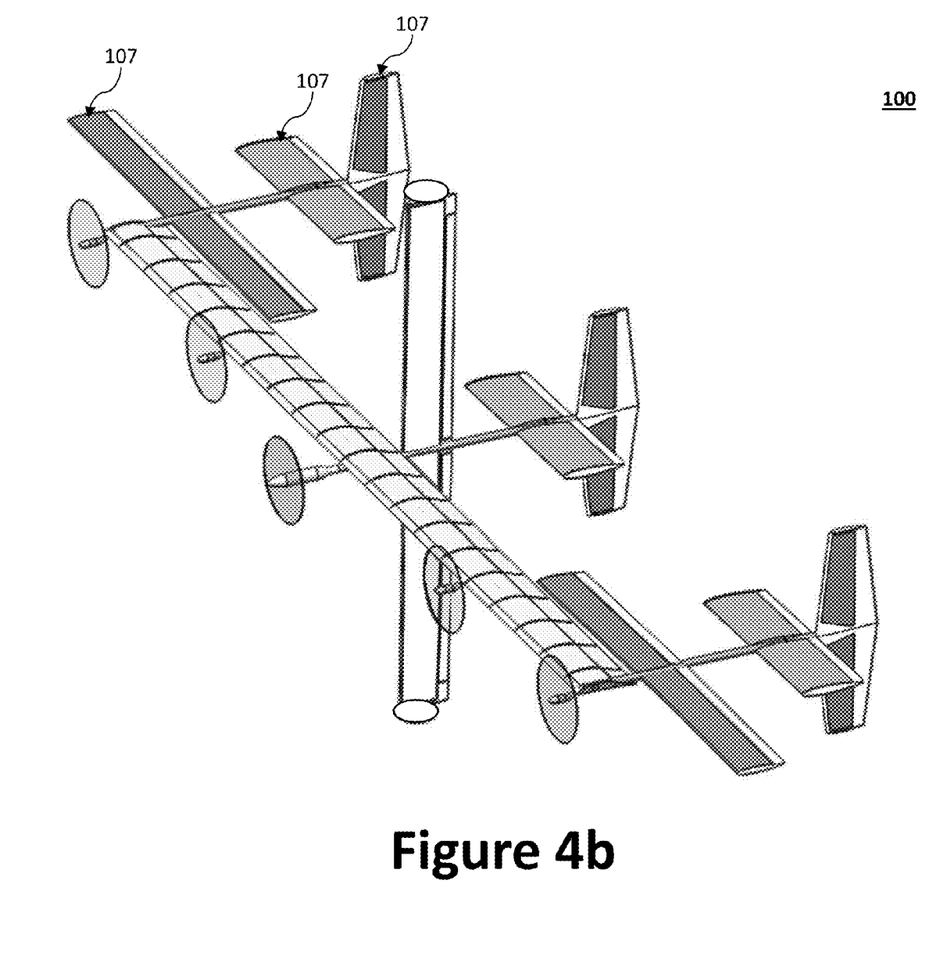

The solar-powered aircraft 100 may further comprise a control system operable to control the various functions of the solar-powered aircraft 100. The control system, or subsystem, may be further configured to rotate, about a longitudinal pivot axis 303, the secondary wing panels 103, first tail panel 201, second tail panel 202, or combinations thereof. The control system operates to rotate solar panel comprising surfaces in a direction toward the sun (e.g., the planar surface of the solar panel is perpendicular to the sun's rays). In some embodiments, the secondary wing panel 103 can be rotated from 0 degrees to 180 degrees about a longitudinal pivot axis 303 to ensure that the solar panels 107 on a surface of the secondary wing panel 103 or other component are oriented towards the sun to maximize power generation. For example, as illustrated in FIG. 1, when the sun is near the horizon, the secondary wing panels 103 would have their spanwise axis vertical (e.g., 90 degrees relative to the fixed wing panel 102) and the solar panels 107 would be aimed approximately horizontal—oriented directly towards the sun—thereby collecting a maximum energy. When the sun is overhead (relative to the aircraft) the secondary wing panels 103 would have their spanwise axis horizontal as illustrated in FIGS. 2 and 4 (e.g., parallel to the transverse axis of the fixed wing panel 102) such that the solar panels 107 are be aimed upward and oriented towards the sun. When the sun is located at intermediate elevations, the secondary wing panels 103 could either be oriented vertically or horizontally, as mentioned above with reference to FIGS. 1-2 and 4, or positioned at an intermediate angle that maximizes solar power generation as illustrated in FIG. 3. In certain aspects, using the control system, the left wing tip panel may be oriented such that the solar panel is oriented towards the right and up (i.e., outboard wing tip up, inboard wing tip down), while the right wing tip panel is also aimed to the right and up (i.e., outboard wing tip down, inboard wing tip up). This "anti-symmetric" arrangement, with a wide range of possible panel tilt angles, while more difficult to control in terms of aerodynamics, results in maximum possible collection effectiveness, and may be worth the cost and effort depending upon the need.

While the intermediate angle of the secondary wing panels 103 of FIG. 3 is illustrated as approximately 45 degrees relative to the fixed wing panel 102, other angles are contemplated. Indeed, an advantage of the secondary wing panels 103 is their ability to rotate (pivot) at least 180 degrees, which allows the solar panels 107 to be oriented to either side of the solar-powered aircraft 100. Thus, based on the heading of the solar-powered aircraft 100, the secondary wing panels 103 can be rotated in a manner that maximizes the exposure of the solar panels 107 to the sun. In fact, the secondary wing panels 103 may be dynamically rotated between 0 and 180 degrees (including intermediate angles therebetween) based on the elevation of the sun, which may be tracked by a control system using one or more sensors (e.g., a solar position sensor). The one or more sensors may be aboard the solar-powered aircraft 100 and integral with the payload 302, which will be discussed below. Additionally, the ability of the secondary wing panels 103 to rotate 180 degrees allows for solar panels 107 to be present on a single surface of the panels, thereby saving cost and weight, while increasing flight efficiencies.

In certain aspects, the secondary wing panels 103 may rotate about a longitudinal pivot axis 303, wherein the secondary wing panels 103 have substantially equal areas on each side of the axis. This balance significantly reduces the aerodynamic force moment about the pivot axis (e.g., at the pivot assembly 105), allowing for more efficient rotation of the secondary wing panels 103. Accordingly, either smaller motor assemblies can be used at the pivot assembly 105 to rotate the secondary wing panels 103, or the secondary wing panels 103 can be rotated faster using the same or larger motor assemblies.

In certain aspects, the secondary wing panels 103, first tail panels 201, and second tail panels 202 are configured to rotate independently to maximize the efficiency of each solar panel. In other embodiments, the secondary wing panels 103, first tail panels 201, and second tail panels 202 are configured to rotate together (e.g., in unison), wherein each component is substantially oriented in the same manner about a longitudinal pivot axis 303 of fixed wing panel 102. For example, FIG. 3 depicts an embodiment of the present invention wherein the secondary wing panels 103, first tail panels 201, and second tail panels 202 are configured to rotate together, wherein each component is substantially oriented in the same manner about a longitudinal pivot axis 303 of fixed wing panel 102. In such a case, the components may share a pivot assembly 105. Alternatively, separate pivot assemblies may be used for each component, but controlled in unison.

In some embodiments, the secondary wing panels 103 could have traditional aerodynamic trailing edge control surfaces, which would allow production of control moments about the pivot axes and allow the panels to be moved by aerodynamic forces. For example, when the secondary wing panels 103 are locked in place, such control surfaces could function as traditional ailerons or camber changing flaps.

In other embodiments, the control surfaces of the secondary wing panels 103 could only be on the side of the surfaces without solar panels, such as traditional "split flaps", to maximize the area available for collecting sunlight. Additionally, in some embodiments, the trailing edge control surfaces can be manipulated appropriately for each flight mode to optimize the aerodynamic efficiency. For example, when the secondary wing panels 103 are vertical (i.e., perpendicular to the fixed wing panel 102), they can act as winglets. While not necessarily contributing to lifting the weight of the aircraft, they would substantially reduce the drag due to lift of the aircraft, minimizing the power needed while simultaneously increasing the solar energy collected. The power needed to fly the solar-powered aircraft 100 would still be more than the above case with panels flat, but much less than the power needed by the basic wing alone. Additionally, with proper aerodynamic shaping of the secondary wing panels 103, the secondary wing panels 103 can produce lift and thus increase the effective wing span and aspect ratio of the solar-powered aircraft 100, thereby reducing drag due to lift and/or allowing a slower flight speed at night, both of which can dramatically reduce the energy needed to fly the solar-powered aircraft 100 at night, and reducing the mass of the energy storage system, or conversely allowing the operation of the aircraft at higher latitudes in the winter time. In some embodiments, the wing efficiency of the fixed wing panel 102 and the plurality of secondary wing panels 103 could approach that of a conventional wing of the same total area and wing span. For example, in an embodiment depicted in FIG. 4, the secondary wing panels are rotated in a horizontal position to increase the effective wingspan of the aircraft, which can decrease the total power consumption of the aircraft during periods where solar energy collection is limited or impractical, e.g., during the night.

In some embodiments, the secondary wing panels 103 may be released to freely rotate when the solar-powered aircraft 100 is encountering turbulence, as a way to reduce the structural loads on the aircraft. For instance, the pivot brake of the pivot assembly 105 may be released, thereby allowing the secondary wing panel 103 to freely rotate about the pivot. In this case, the position of the secondary wing panels 103 may be controlled by the previously mentioned control surfaces on the secondary wing panels 103. For example, the control system of the solar-powered aircraft 100 may be configured to detect turbulence and, upon detection, release one or more pivot brakes. In certain aspects, the control system may release the one or more pivot brakes depending on the degree of turbulence and/or location or position of the pivot brake within the solar-powered aircraft 100.

In some embodiments, the solar-powered aircraft 100 may further comprise an auxiliary wing panel 301. Referring to the embodiment depicted in FIG. 1, the auxiliary wing panel 301 is a configured to rotate about a longitudinal pivot axis 303 of the fixed wing panel 102 in substantially the same manner as the secondary wing panels 103.

The auxiliary wing panel 301 may further comprise one or more payloads 302. As used herein, "payload" refers to one or more sensors, communications packages, weapons systems, instruments, antennas, cameras, radars, navigation systems, flight control systems, or other cargo. For example, navigation and flight control systems may be communicatively coupled with an inertial navigation system ("INS") that is communicatively coupled with an inertial measurement unit and global positioning system ("GPS") receiver, an onboard data storage device (e.g., hard drive, flash memory, or the like), a wireless communication device, or virtually any other desired services. The GPS gives an absolute drift-free position value that can be used to reset the INS solution or can be blended with it by use of a mathematical algorithm, such as a Kalman Filter.

The one or more payloads 302 may also house an intelligence, surveillance, and reconnaissance ("ISR") payload, which may be used to collect data and/or monitor an area. For example, the solar-powered aircraft 100 may be equipped with one or more cameras, audio devices, and other sensors. Any video, or other data, collected by the solar-powered aircraft 100 may be communicated to a ground control station in real time wirelessly. The solar-powered aircraft 100 may be further equipped to store said video and data to the onboard data storage device. In other aspects, the one or more payloads 302 may include hardware that operates as a communication relay or router. For example, the solar-powered aircraft 100 may receive signals from a remotely situated device (e.g., a satellite, communication tower, or even another solar-powered aircraft) via an on board antenna. The solar-powered aircraft 100 may then relay the information from the remotely situated device to an end user on the ground proximate to the solar-powered aircraft 100. Likewise, to facilitate two-way communication, the solar-powered aircraft 100 may receive information from the end user on the ground and relay it to the remotely situated device.

Figure 5A:
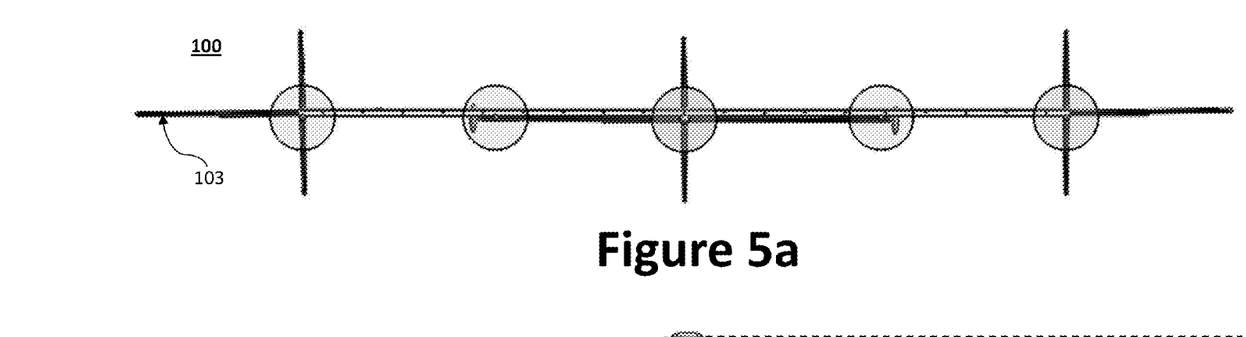
FIGS. 5a and 5b illustrate a solar-powered aircraft of FIG. 1, wherein a payload located at an upper wing tip of an auxiliary wing panel is illustrated as having an unobstructed horizontal field of view.
Figure 5B:
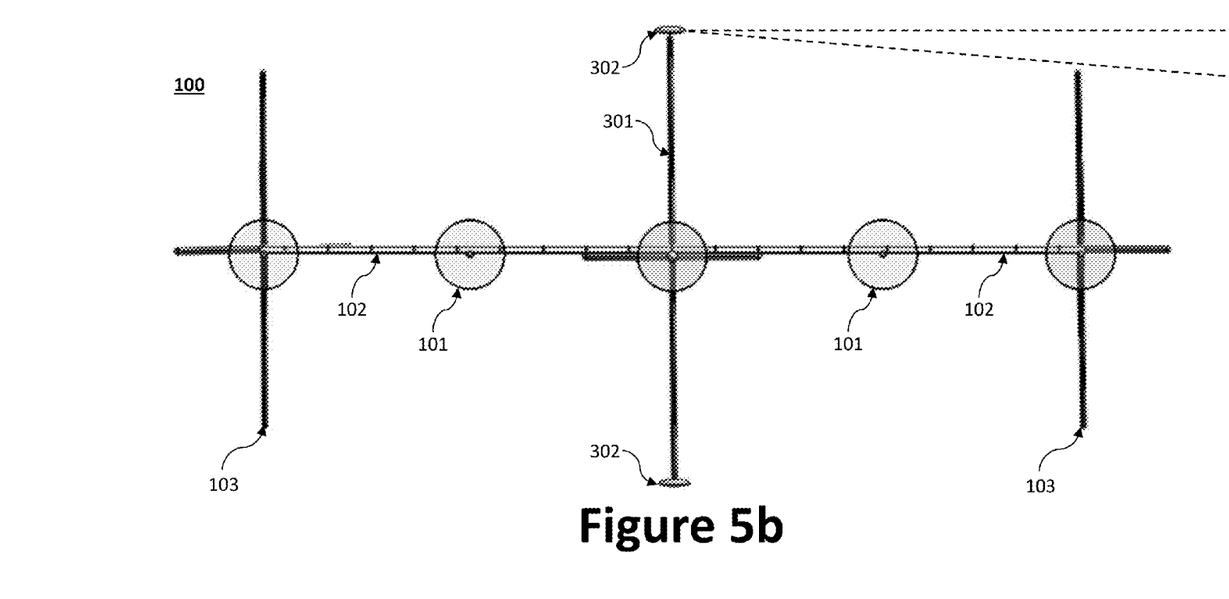

In some embodiments, the auxiliary wing panel 301 comprises solar panels 107 on a surface of the auxiliary wing panel 301. In some embodiments, the auxiliary wing panel 301 is rotated into the horizontal position (i.e., substantially co-planar with the fixed wing panel 102) when the aircraft is taking off or landing, and is rotated into the vertical position (i.e., substantially perpendicular to the fixed wing panel 102) at all times while on station. In embodiments wherein the auxiliary wing panel 301 is located aft of the wing, it is sized to fit between the two secondary wing panels when all panels are horizontal (i.e., substantially co-planar with the fixed wing). In some embodiments, the auxiliary wing panel 301 oriented in the vertical position (i.e., substantially perpendicular to the fixed wing panel 102) allows for a payload 302 located on a lower end of the auxiliary wing panel 301 to have a large field of view in azimuth without blockage by other parts of the aircraft. Similarly, if the auxiliary wing panel 301 has a greater height than the secondary wing panels when in the vertical (i.e., substantially perpendicular to the fixed wing panel 102) a payload 302 located at the upper end of the auxiliary wing panel 301 provides a horizontal looking payload 302 having a large, unobstructed field of view as illustrated in FIG. 5b.

In some embodiments, the auxiliary wing panel 301 comprises solar panels 107 located on a surface of the auxiliary wing panel 301. While not being bound to one particular theory, if the auxiliary wing panel 301 is kept in a vertical position (i.e., substantially perpendicular to the fixed wing panel 102), the presence of solar panels 107 on both sides of the auxiliary wing panel 301 allows for the collection of solar energy at low sun elevations on both sides of the aircraft as illustrated in FIG. 1.

In some embodiments, the solar-powered aircraft 100 may comprise one or more propeller assemblies 101, each having a propeller, which is driven (i.e., rotated about an axis) by an electric motor. The propeller may be driven by the motor either directly or indirectly through a transmission and associated gearing. In certain aspects, a single electric motor may be configured to drive plural propellers through a transmission or other gearing configuration; however a dedicated electric motor may be provided for each propeller if desired. The propeller assemblies 101 may be attached to the fixed wing panel 102 (e.g., at a rib), a fuselage 106, or longitudinal boom 104. The electric motors are preferably direct current ("DC") brushless motors, but other motor types may be used to meet a particular need.

The solar-powered aircraft 100 may comprise one or more fuselages 106 and longitudinal boom 104. In some embodiments, the secondary wing panel 103, first tail panels 201, second tail panels 202 and/or auxiliary wing panel 301 are configured to rotate about the longitudinal pivot axis (Axis B) defined by the fuselage 106 or longitudinal boom 104.

Figure 6A:
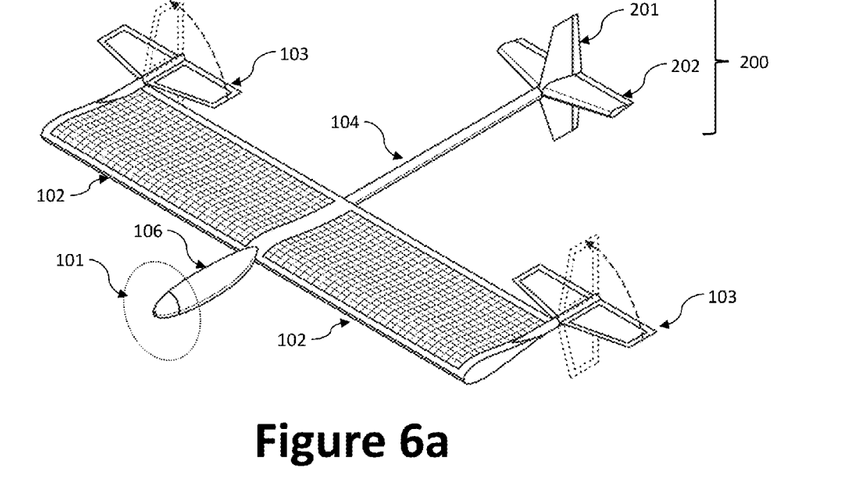
FIGS. 6a and 6b illustrate a solar-powered aircraft in accordance with a second aspect of the present invention.
Figure 6B:
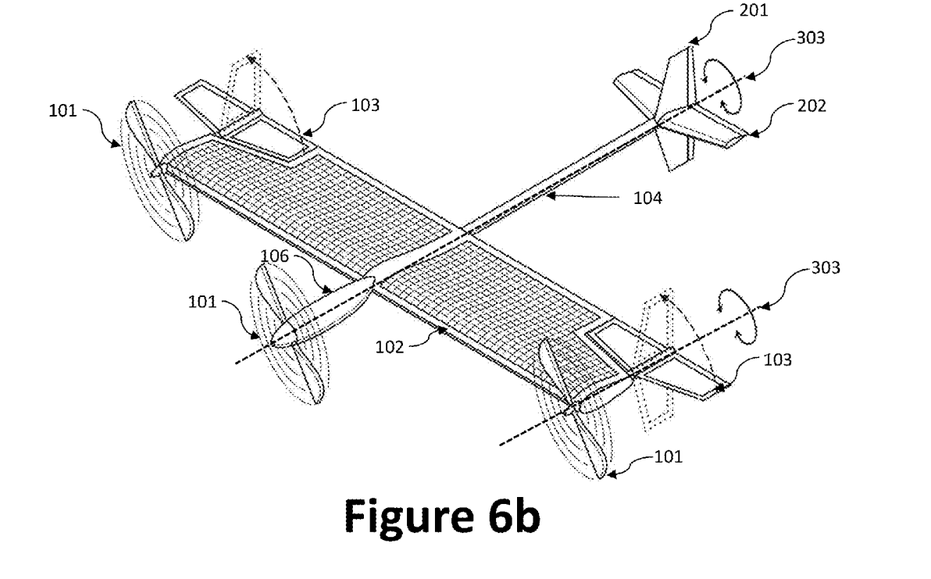

While the solar-powered aircraft 100 has been generally described with reference to the configuration of FIG. 1 through FIG. 5b, the solar-powered aircraft 100 must not be limited to that configuration or any particular configuration. With reference to FIGS. 6a and 6b, for example, the solar-powered aircraft 100 may include a normal wing (unswept) of a size and airfoil shape appropriate for supporting a particular airplane under the desired operating conditions. More specifically, FIGS. 6a and 6b depict a solar-powered aircraft 100, comprising a fuselage 106, a longitudinal boom 104, one or more propeller assemblies 101, a fixed wing panel 102, a plurality of secondary wing panels 103, and a tail section 200, the tail section 200 having a first tail panel 201 and a second tail panel 202. The fixed wing panel 102 may or may not have solar panels 107, depending on the needs of a given aircraft.

As illustrated, a secondary wing panel 103 may be pivotally coupled at each wing tip of the fixed wing panel 102 via a pivot assembly. The secondary wing panels 103 are configured to rotate about a longitudinal pivot axis 303 extending from a distal end of the fixed wing panel 102 through a central transverse portion of the secondary wing panel 103. As illustrated in FIG. 6b, for example, the fixed wing panel 102 may be further sized and shaped such that its profile includes a cutout, whereby a portion of the secondary wing panels 103 nests within the cutout of the fixed wing panel 102. For example, approximately half of each of the secondary wing panels 103 (e.g., from the central transverse portion to the wing tip) may reside within the cutout, which may have a profile defined to correspond with the profile of the secondary wing panel 103 positioned within the cutout. Accordingly, when the secondary wing panels 103 are position at the same angle and lie in the same plane as illustrated, turbulence may be mitigated as a portion of each secondary wing panel 103 is nested fixed wing panel 102, effectively becoming an extension of the fixed wing panel 102.

The secondary wing panels 103 may further include traditional aerodynamic trailing edge control surfaces, which would allow production of control moments about the pivot axes and allow the panels to be moved by aerodynamic forces. When the secondary wing panels 103 are locked in place, these control surfaces could function as traditional ailerons or camber changing flaps.

In certain aspects, the solar-powered aircraft 100 may be configured to hover or otherwise achieve a vertical takeoff and/or landing maneuver, thereby obviating the need to maintain forward or wing-borne flight. To that end, the propeller assemblies 101 may be pivoted upwardly, such that the thrust generated by the propeller assemblies 101 is directed downwardly. To maintain balance of the solar-powered aircraft 100, additional propeller assemblies 101 may be positioned aft of the fixed wing panel 102. For example, additional propeller assemblies 101 may be provided at the tail section 200 or between the tail section 200 and the fixed wing panel 102.

In one aspect, the solar-powered aircraft 100 may further employ a method of collecting solar energy on a solar-powered aircraft 100, the method comprising providing a solar-powered aircraft 100 having one or more propeller assemblies 101, a fixed wing panel 102, and a plurality of secondary wing panels 103 configured to rotate about a longitudinal pivot axis 303 extending from a distal end of the fixed wing panel 102 through a central transverse portion of the secondary wing panel, wherein the secondary wing panels comprise an array of solar panels 107 on a surface of the secondary wing panels, collecting solar energy with the array of solar panels 107 by rotating the secondary wing panels in a direction to the sun.

In another aspect, the solar-powered aircraft 100 may further employ a method of continuously operating a solar-powered aircraft 100 comprising providing a solar-powered aircraft comprising one or more propeller assemblies 101, a fixed wing panel 102, and a plurality of secondary wing panels 103 configured to rotate about a longitudinal pivot axis 303 extending from a distal end of the fixed wing panel 102 through a central transverse portion of the secondary wing panel, wherein the secondary wing panels comprise an array of solar panels 107 on a surface of the secondary wing panels, collecting, using and storing solar energy with the arrays of solar panels 107 by rotating the secondary wing panels in a direction to the sun during the day, rotating the secondary wing panels in a position that is substantially co-planar to the fixed wing panel 102 during the night, and using the stored solar energy to operate the aircraft during the night.

Any patents, patent publications, or articles cited herein are hereby incorporated by reference in their entirety. It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A solar-powered aircraft comprising:
   a fixed wing panel;
   a motor-driven propeller;
   a plurality of secondary wing panels, each of the plurality of secondary wing panels configured to rotate about a longitudinal pivot axis extending from the fixed wing panel through a central transverse portion of said secondary wing panel,
   wherein each of the plurality of secondary wing panels comprises one or more moveable control surfaces configured to manipulate airflow to alter or maintain flight characteristics of the solar-powered aircraft, and
   wherein each of the plurality of secondary wing panels comprises a first array of solar panels on its surface; and
   a tail assembly having a first tail panel and a second tail panel,
   wherein the first tail panel comprises a second array of solar panels located on a surface of the first tail panel, the first tail panel being configured to rotate about a second longitudinal pivot axis through a central transverse portion of said first tail panel.

2. The solar-powered aircraft of claim 1, wherein the longitudinal pivot axis of at least one of the plurality of secondary wing panels coincides with the second longitudinal pivot axis.

3. The solar-powered aircraft of claim 1, wherein at least one of the plurality of secondary wing panels, the first tail panel, or the second tail panel is configured to rotate at least 180 degrees relative to a transverse axis of the fixed wing panel.

4. The solar-powered aircraft of claim 1, wherein each of the plurality of secondary wing panels is configured to rotate about its longitudinal pivot axis based on measurements determined by an onboard solar position sensor.

5. A solar-powered aircraft comprising:
   a fixed wing panel;
   a motor-driven propeller;
   a plurality of secondary wing panels, each of the plurality of secondary wing panels configured to rotate about a longitudinal pivot axis extending from the fixed wing panel through a central transverse portion of said secondary wing panel,
   wherein each of the plurality of secondary wing panels comprises one or more moveable control surfaces to alter or maintain flight characteristics of the solar-powered aircraft, and
   wherein each of the plurality of secondary wing panels comprises an array of solar panels on its surface; and
   a tail assembly having a first tail panel,
   wherein the first tail panel comprises a second array of solar panels located on a surface of the first tail panel, the first tail panel being configured to rotate about a second longitudinal pivot axis through a central transverse portion of said first tail panel.

6. The solar-powered aircraft of claim 5, wherein the plurality of secondary wing panels is configured to rotate in unison.

7. The solar-powered aircraft of claim 5, wherein each of the plurality of secondary wing panels is configured to rotate at least 180 degrees about its longitudinal pivot axis.

8. The solar-powered aircraft of claim 7, further comprising a solar position sensor to determine an elevation of the sun relative to the solar-powered aircraft.

9. The solar-powered aircraft of claim 8, wherein each of the plurality of secondary wing panels is configured to rotate about its longitudinal pivot axis based on measurements determined by the solar position sensor.

10. The solar-powered aircraft of claim 5, wherein the tail assembly further comprises a second tail panel, wherein the second tail panel is configured to rotate about a second longitudinal pivot axis through a central transverse portion of said second tail panel.

11. The solar-powered aircraft of claim 10, wherein the second tail panel comprises an array of solar panels on a surface of the second tail panel.

12. The solar-powered aircraft of claim 5, wherein each of the plurality of secondary wing panels is configured to rotate via a pivot assembly, the pivot assembly having a pivot brake to lock the pivot assembly at a predetermined angle relative to the fixed wing panel.

13. The solar-powered aircraft of claim 5, wherein the motor-driven propeller is coupled to the fixed wing panel.

14. The solar-powered aircraft of claim 5, wherein the fixed wing panel is sized and shaped to define at each of its wing tips a cutout, each cutout being sized and shaped to nest a portion of the secondary wing panels when the fixed wing panel and the plurality of secondary wing panels reside in the same plane.

15. A method of continuously operating a solar-powered aircraft having a fixed wing panel, a motor-driven propeller, a secondary wing panel, and a tail panel, the method comprising:
   (i) collecting and storing solar energy via an array of solar panels positioned on the secondary wing panel, wherein the secondary wing panel is positioned in a first position;
   (ii) rotating the secondary wing panel from the first position to a second position about a first longitudinal pivot axis extending from the fixed wing panel through a central transverse portion of said secondary wing panel;
   (iii) altering a flight characteristic of the solar-powered aircraft via one or more movable control surfaces positioned on the secondary wing panel;
   (iv) rotating the tail panel about a second longitudinal pivot axis through a central transverse portion of said tail panel, wherein the tail panel comprises a second array of solar panels located on a surface of the tail panel; and
   (v) using the solar energy to operate the solar-powered aircraft.

16. The method of claim 15, wherein the secondary wing panel is substantially co-planar to the fixed wing panel when the secondary wing panel is in the second position.

17. The method of claim 16, wherein the secondary wing panel is not co-planar to the fixed wing panel when the secondary wing panel is in the first position.

18. The method of claim 17, wherein the secondary wing panel is positioned (a) in the first position during daytime and (b) in the second position during nighttime.

19. The method of claim 15, wherein the solar-powered aircraft is configured to use the solar energy stored at step (i) during nighttime operation.

20. The solar-powered aircraft of claim 5, wherein the solar-powered aircraft defines a longitudinal roll axis, wherein the longitudinal pivot axis of at least one of the plurality of secondary wing panels coincides substantially with longitudinal roll axis.

21. The solar-powered aircraft of claim 1, wherein each of the plurality of secondary wing panels is configured to rotate independently of one another to improve energy collection efficiency.

22. The solar-powered aircraft of claim 12, wherein (1) at least one of the plurality of secondary wing panels is pivotally coupled to the fixed wing panel via a first pivot assembly positioned at a first wing tip and (2) at least one of the plurality of secondary wing panels is pivotally coupled to the fixed wing panel via a second pivot assembly positioned at a second wing tip.

* * * * *